United States Patent [19]
Palackal et al.

[11] Patent Number: 6,096,915
[45] Date of Patent: Aug. 1, 2000

[54] PROCESSES TO PRODUCE ORGANO-ALUMINOXANE COMPOSITIONS

[76] Inventors: Syriac J. Palackal; M. Bruce Welch; Rolf L. Geerts, all of P.O. Box 2443, Bartlesville, Okla. 74005

[21] Appl. No.: 08/929,219

[22] Filed: Sep. 9, 1997

Related U.S. Application Data

[63] Continuation of application No. 08/660,982, Jun. 12, 1996, abandoned.

[51] Int. Cl.$^7$ .................................................. C07F 5/06
[52] U.S. Cl. ........................ 556/179; 556/187; 556/190; 526/160; 526/943
[58] Field of Search .................................. 556/179, 187, 556/190

[56] References Cited

U.S. PATENT DOCUMENTS

| | | | |
|---|---|---|---|
| 5,354,721 | 10/1994 | Geerts | 502/117 |
| 5,411,925 | 5/1995 | Geerts et al. | 502/117 |
| 5,436,212 | 7/1995 | Geerts | 502/113 |

FOREIGN PATENT DOCUMENTS

| | | |
|---|---|---|
| 0 279 586 A2 | 8/1988 | European Pat. Off. . |
| 0 285 443 A1 | 10/1988 | European Pat. Off. . |
| 0 363 029 A2 | 1/1990 | European Pat. Off. . |
| 0 515 132 A2 | 11/1992 | European Pat. Off. . |
| 0 557 107 A2 | 8/1993 | European Pat. Off. . |
| 0 683 179 A1 | 11/1995 | European Pat. Off. . |
| 0 685 494 A1 | 10/1998 | European Pat. Off. . |

*Primary Examiner*—David W. Wu
*Assistant Examiner*—Ling Sui Choi
*Attorney, Agent, or Firm*—Edward L. Bowman

[57] ABSTRACT

Processes are provided that produce organo-aluminoxane compositions. Said processes comprise: desiccating a first mixture, where said first mixture comprises organo-aluminoxane molecules intermixed with a solvent, to produce a first composition, where said first composition comprises organo-aluminoxane molecules; mixing said first composition with a solvent to produce a second mixture, where said second mixture comprises organo-aluminoxane molecules and said solvent; contacting said second mixture with a insolublization agent to produce said organo-aluminoxane compositions. A polymerization process using a catalyst that comprises an organo-aluminoxane composition is also provided.

34 Claims, No Drawings

PROCESSES TO PRODUCE ORGANO-ALUMINOXANE COMPOSITIONS

This application is a File Wrapper Continuation of application Ser. No. 08/660,982, filed on Jun. 12, 1996, now abandoned.

This invention is related to the field of organo-aluminoxane compositions.

BACKGROUND OF THE INVENTION

Organo-aluminoxanes have been found to be useful in a wide variety of chemical processes. For example, metallocene-organo-aluminoxane-catalysts, which can be formed by reacting certain metallocenes with certain organo-aluminoxanes, have been used to polymerize olefins. One of the earliest patents containing such a disclosure is U.S. Pat. No. 3,242,099 (the entire disclosure of which is hereby incorporated by reference).

Such metallocene-organo-aluminoxane-catalysts have been used to polymerize olefins using solution polymerization technology. Since such metallocene-organo-aluminoxane-catalysts are soluble in the solution polymerization medium, it has been generally observed that the resulting polymer has a low bulk density, as well as, other undesirable qualities.

Attempts to use such metallocene-organo-aluminoxane-catalysts to polymerize olefins using slurry polymerization technology have not been satisfactory. In slurry polymerization, the polymerization conditions are selected so that the desired polymer forms as discrete particles that are insoluble, or only sightly soluble, in the slurry polymerization medium, which is usually an aliphatic hydrocarbon. It has been observed that when such slurry polymerizations are carried out using such metallocene-organo-aluminoxane-catalysts, the desired polymer coats the interior surface of the slurry polymerization vessel. This coating of the slurry polymerization vessel's interior surface is detrimental. This is because such coating adversely effects the heat transfer from the slurry polymerization vessel. Additionally, such coating results in the need for periodic, if not continuous, cleaning of the slurry polymerization vessel, in order to prevent such vessel from fouling.

It is known that heterogeneous catalysts can be useful in slurry polymerizations. Heterogeneous catalysts are catalysts that are not soluble, or only slightly soluble, in the polymerization medium.

It is known that a solid form of organo-aluminoxane can be obtained by mixing an organo-aluminoxane solution with a counter solvent; however, this solid, when used as part of a heterogeneous catalyst, has been found to cause fouling in a slurry polymerization vessel. Even when a counter solvent is used to precipitate the organo-aluminoxane onto an hydrocarbon-insoluble-particulate-carrier, fouling is still a problem during slurry polymerizations.

Consequently, processes to produce organo-aluminum compositions, which are useful in producing heterogeneous catalysts that can be used in slurry polymerizations without fouling the polymerization vessel, are greatly needed. Additionally, since metallocene-organo-aluminoxane catalysts are expensive to produce, processes that reduce the cost of producing these catalyst, or processes that increase to usefulness of these catalysts, are desired.

SUMMARY OF THE INVENTION

It is an object of this invention to provide processes to produce organo-aluminoxane compositions.

In accordance with this invention, processes are provided that produce organo-aluminoxane compositions, said processes comprise:

(a) desiccating a first mixture, where said first mixture comprises organo-aluminoxane molecules intermixed with a solvent, to produce a first composition, where said first composition comprises organo-aluminoxane molecules;

(b) mixing said first composition with a solvent to produce a second mixture, where said second mixture comprises organo-aluminoxane molecules and said solvent;

(c) contacting said second mixture with a insolublization agent to produce said organo-aluminoxane compositions.

Additionally, polymerization processes that use catalyst that comprise organo-aluminoxane compositions produce in accordance with this invention.

Other objects and their advantages will become apparent to those skilled in the art having the benefit of the following.

DETAILED DESCRIPTION OF THE INVENTION

The organo-aluminoxane molecules useful in this invention can be made by various techniques are known in the art. For example, one technique involves the controlled addition of water to a trialkylaluminum. Another technique involves combining a trialkylaluminum and a hydrocarbon with a compound containing water of adsorption, or a salt containing water of crystallization. Additionally, solution containing organo-aluminoxane molecules can be obtain from a wide variety of commercial sources. Solutions containing organo-aluminoxane molecules obtained from commercial sources are generally in the form of hydrocarbon solutions. In general, these solutions also contain trialkylaluminum intermixed with the organo-aluminoxane molecules and the solvent.

The exact structure of organo-aluminoxanes molecules is often the subject of much discussion between scholars. It is generally accepted that the organo-aluminoxanes molecules are oligomeric, linear and/or cyclic molecules having repeating units of the formula:

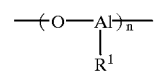

Typically, linear organo-aluminoxane molecules are said to fit the following formula:

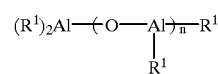

Oligomeric, cyclic organo-aluminoxanes are generally viewed as having the formula:

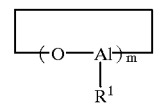

In the above formulas, $R^1$ is a hydrocarbyl group, typically a $C_1-C_8$ alkyl group, and n is typically 2 to 100, preferably 10 to 35, m is typically 3 to 50.

Typically, in metallocene-organo-aluminoxanes catalysts used in the polymerization of olefins, $R^1$ is predominantly methyl or ethyl. Preferably about 30 mole percent of the repeating groups have an $R^1$ which is methyl, more preferably about 50 mole percent, and still more preferably about 70 mole percent of the repeating units have methyl as the $R^1$ group.

The insolublization agent useful in this invention is any molecule that can react with an organo-aluminoxane molecule to produce an organo-aluminoxane-insolublization-agent molecule (hereafter "organo-aluminoxane composition") where said organo-aluminoxane composition is less soluble in the solvent that said reaction takes place in. Examples of suitable insolublization agents include, but are not limited to, oxides, peroxides, alkylene oxides, organic carbonates, organic compounds containing boron, and dihydrocarbyl Group IIA metal compounds.

For example, oxides useful in this invention are those molecules where the oxygen is free to react with the organo-aluminoxane molecules. Examples of such oxides include but are not limited to carbon monoxide and carbon dioxide.

For example, peroxides useful in this invention are represented by the formula $R^2OOR^3$, wherein $R^2$ and $R^3$ are individually selected from hydrogen, hydrocarbyl, and hydrocarbonyl radicals selected from the group consisting of alkyl, cycloalkyl, aryl, alkenyl, and alkynyl radicals containing 1 to 24 carbon atoms, preferably 1 to 18 carbon atoms and more preferably 1 to 12 carbon atoms, with the proviso that at least one of $R^2$ and $R^3$ is a hydrocarbyl or hydrocarbonyl radical. Preferably both $R^2$ and $R^3$ are individually hydrocarbyl radicals. Examples of suitable peroxides include diethyl peroxide, diacetyl peroxide, tert-butyl hydroperoxide, di-tert-butyl peroxide 2,5-dimethyl-(2,5-di(tert-butylperoxy) hexane, tert-amyl hydroperoxide, di-tert-amyl peroxide, dibenzoyl peroxide, dicrotonyl peroxide, bis(1-methyl-1-phenylethyl) peroxide, dilauryl peroxide, peroxybenzoic acid, peroxyacetic acid, tert-butyl perbenzoate, tert-amyl perbenzoate, peroxybutyric acid, peroxycinnamic acid, tert-butyl peracetate, and the like and mixtures thereof. Excellent results have been obtained with di-tert-butyl peroxide and it is currently preferred.

For example, alkylene oxides useful in this invention are represented by the formulas $$(R^4)_2C\underset{O}{\overset{}{\triangle}}C(R^5)_2$$

or $$(R^4)_2C\underset{O}{\overset{}{\triangle}}CR^5(C(R^4)_2)_xR^5C\underset{O}{\overset{}{\triangle}}C(R^4)_2$$

wherein $R^4$ and $R^5$ are individually selected from the group consisting of hydrogen and alkyl radicals containing 1 to 12 carbon atoms, x is 0 to 12, preferably 0 to 8. Examples of suitable alkyl radicals include methyl, ethyl, propyl, isobutyl, isoamyl, octyl and decyl. Examples of suitable alkylene oxides include ethylene oxide, propylene oxide, 2,2-dimethyloxirane, 1,2-dimethyloxirane, 1,2-diethyloxirane, cyclohexene oxide, 1-methylcyclohexene oxide, and mixtures thereof. Other suitable alkylene oxides include glycidyl ethers having the formula $R^6(G)_y$ wherein $R^6$ is a hydrocarbyl radical having 2 to 12 carbon atoms, y is 1 or 2, and G is the glycidyl group, the formula of which follows.

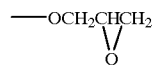

Examples of suitable glycidyl ethers include glycidyl isopropyl n-butyl ether, glycidyl tert-butyl ether, 2,2-dimethyl-1,3-propanediol diglycidyl ether, and 1,4-butanediol diglycidyl ether. Alkylene oxides containing a total of 2 to 16 carbon atoms are preferred, more preferably 2 to 12 carbon atoms. Propylene oxide is currently preferred.

For example, organic carbonates useful in this invention are represented by the formulas

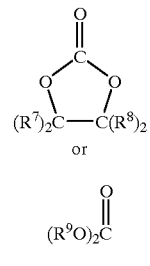

wherein $R^7$ and $R^8$ are individually selected from the group consisting of hydrogen and alkyl radicals containing 1 to 10 carbon atoms and $R^9$ is a hydrocarbyl radical selected from the group consisting of alkyl, cycloalkyl, aryl, aralkyl, and alkylaryl radicals having 1 to 12 carbon atoms. The alkyl radical can be straight chain or branched. Examples of suitable alkyl radicals include methyl, ethyl, propyl, isobutyl, isoamyl, octyl and decyl. Examples of suitable organic carbonates include 1,3-dioxolan-2-one (commonly named ethylene carbonate), 4-methyl-1,3-dioxolan-2-one (commonly named propylene carbonate), 4,5-dimethyl-1,3-dioxolan-2-one, 4-(1-butyl)-1,3-dioxolan-2-one, 4,5-di(1-propyl)-1,3-dioxolan-2-one dimethyl carbonate, diethyl carbonate, bis(2-methylallyl) carbonate, dibenzyl carbonate, and diphenyl carbonate, and mixtures thereof. Preferred organic carbonates are those wherein the carbonyldioxy radical is attached to a terminal carbon atom and the carbon adjacent thereto. Propylene carbonate is currently preferred.

For example, organic compounds containing boron, include organic boranes, organic borates, organic boroxines. As used herein "organic boranes" will include all the following compounds which are useful in this invention. Organic boranes that are useful in this invention are those that are acidic hydrogen free (the phrase "acidic hydrogen free" as used herein is intended to refer to borane compounds free of acidic hydrogens such as hydroxy hydrogens, acid hydrogens, and phenolic hydrogens) and that contain the following functionality.

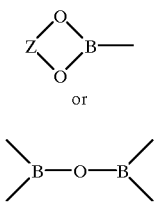

wherein Z is a bridging unit between two oxygen atoms.

Examples of such compounds include compounds of the formula

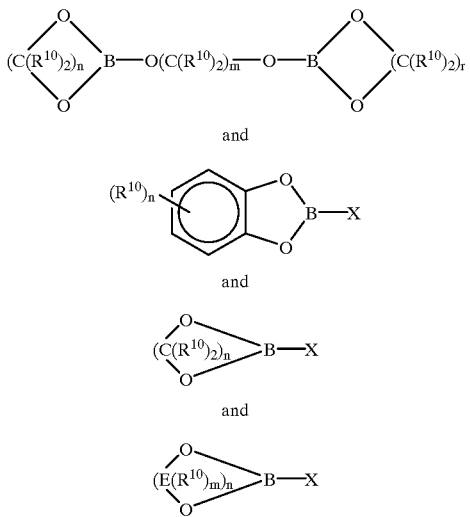

and $(R^{10})_2BOB(R^{10})_2$ wherein each $R^{10}$ is individually selected from hydrogen and hydrocarbyl radicals, preferably aryl or alkyl radicals having 1 to 20 carbon atoms; n, m, and r are integers preferably in the range of 1 to 10; each E is individually selected from C, Si, Ge, Sn, B, Ga, In, P, As, and Sb with the proviso that at least one E is not C; and X is selected from hydrogen, hydrocarbyl radicals having 1 to 20 carbon atoms, halides, hydrocarbyloxy radicals having 1 to 20 carbon atoms, and $—N(R^{10})_2$ radicals. Some specific examples include catechol borane, diphenyl borinic anhydride, dibutyl borinic anhydride, trimethylene borate, methyl catechol borane, trimethylboroxine and the like, as well as mixtures thereof.

For example, dihydrocarbyl Group IIA compounds useful in this invention are represented by the formula $(R^{11})_2M^1$ where $R^{11}$ is a hydrocarbyl radical having from 1 to about 20 carbon atoms and $M^1$ is a Group IIA metal preferably selected from the group consisting of beryllium, magnesium, calcium, and mixtures thereof.

Further information concerning some of these insolublization agents can be obtained from U.S. Pat. Nos. 5,354,721 and 5,436,212 the entire disclosures of which are hereby incorporated by reference.

The solvents that can be used in this invention can be any suitable hydrocarbon solvent, such as, for example, aromatic and aliphatic solvents. However, it is currently preferred if the solvent is aliphatic, more preferably paraffinic. Additionally it is preferred if the solvent is a liquid at a temperature between about 0° C. to about 175° C., more preferably 50° C. to 150° C., and a pressure from about 0 psia to about 1000 psia.

The first step in the inventive processes to produce organo-aluminoxane compositions is to desiccate a first mixture that comprises organo-aluminoxane molecules intermixed with a solvent to produce a first composition that comprises organo-aluminoxane molecules. This can be accomplished by several different methods.

One method is to take a mixture that comprises organo-aluminoxane molecules and a hydrocarbon solvent, and drying this mixture until substantially all of the hydrocarbon solvent is removed.

Another method is to take a mixture that comprises organo-aluminoxane molecules and a hydrocarbon solvent, and precipitating the organo-aluminoxane molecules, followed by filtering the precipitated organo-aluminoxane molecules from the hydrocarbon solvent. This method can be followed by further desiccating, such as, for example, vacuum drying.

Currently, vacuum drying is the preferred method of desiccating the first mixture.

It is important to note that while a substantial portion of the solvent is removed from being in contact with the organo-aluminoxane molecules, during this first step, not all of the solvent needs to be removed.

While producing the first composition, it is within the scope of the invention to carry out this first step in the presence of a particulate material so that the organo-aluminoxane molecules become intermixed with the particulate material. Typical particulate materials include, but are not limited to, such inorganic materials as silica, alumina, aluminum phosphate, silica-alumina, titania, kaolin, fumed silica, clays, zeolites, and mixtures thereof.

The second step in the inventive processes to produce the organo-aluminoxane compositions, is to mix the first composition with a solvent to produce a second mixture that comprises organo-aluminoxane molecules and said solvent. The second mixture can be a slurry or a gel depending on the desired consistency. Currently, the preferred solvents are linear, branched, and/or cyclic alkanes which are liquids at temperatures from about −80° C. to about 175° C., more preferably 50° C. to 150° C., and pressures from about 0 psia to about 1000 psia. Suitable examples are pentane, hexane, heptane, octane, nonane, decane, isobutane, isopentane, isohexane, isoheptane, isooctane, isononane, isodecane, and mixtures thereof.

The third step in the inventive processes to produce the organo-aluminoxane compositions is to contact said second mixture with an insolublization agent to produce the organo-aluminoxane composition.

It should be understood that steps two and three can be conducted sequentially or they can be conducted simultaneously. These step can be conducted simultaneously by mixing the solvent to be used in step two with the insolublization agent before mixing the solvent with the first composition.

While contacting the second mixture with the insolublization agent, it is within the scope of the invention to carry out this third step in the presence of a particulate material so that the organo-aluminoxane-insolublization-agent-molecules become intermixed with the particulate material. Typical particulate materials would include, but are not limited to, those mention above.

The reaction of the insolublization agent with the organo-aluminoxane can be carried out in any suitable manner. One particularly desirable technique simply involves contacting the two compositions in the solvent.

The amount of the insolublization agent employed relative to the organo-aluminoxane can vary over a wide range depending upon the particular results desired. Generally, the amount of organo-aluminoxane is in the range of from about one mole to about 1000 moles per mole of insolublization agent, preferably about 2 moles to about 500 moles, and more preferably, from 5 moles to 200 moles per mole of insolublization agent.

Such organo-aluminoxane compositions will be suitable in slurry polymerization reactions. Accordingly, the organo-aluminoxane compositions should be suitable as catalyst components with any number of the transition metal-containing olefin polymerization catalysts. Some examples of such transition metal-containing catalysts are disclosed in the previously mentioned U.S. Pat. No. 3,242,099. The use of more than one such catalyst is also possible. It is preferred if the catalyst portion of the catalyst system is selected from transition metal compounds of metals of Groups IVB, VB, and VIB. Examples of the transition metals thus include zirconium, titanium, hafnium, and vanadium. Such compounds can be represented by the formula $M^2X_n$ wherein $M^2$ represents the transition metal atom and X represents a halogen atom or an organo group, and n is the valence state of the transition metal. Some illustrative examples of such transition metal compounds include vanadium dichloride, vanadium trichloride, vanadium tetrachloride, vanadium pentafluoride, vanadium triiodide, titanium tribromide, titanium tetrachloride, titanium trichloride, titanium tetrafluoride, titanium tetraiodide, titanium tetrabromide, zirconium trichloride, zirconium tetrachloride, titanium tetraethoxide, titanium tetrabutoxide, zirconium tetrabutoxide, dicyclopentadienyl titanium dichloride, dicyclopentadienyl zirconium dichloride, cyclopentadienyl dimethyl (t-butyl amido) silane titanium dichloride, and the like.

It is more preferred if the transition metal catalyst component comprises a metallocene. Examples of metallocenes include compounds of the formula $M^3L_x$ wherein $M^3$ is the transition metal, at least one L is a ligand, which is coordinated to the transition metal compound, and has an alkyldienyl skeleton, the other L's can be selected from ligands having alkyldienyl skeletons, hydrocarbon radicals having 1 to 12 carbon atoms, alkoxy radicals having 1 to 12 carbon atoms, aryl oxy radicals having 6 to 12 carbon atoms, halogen, or hydrogen, and x is the valence of the transition metal. Other examples include the hetero-atom containing metallocenes such as disclosed in U.S. Pat. No. 5,057,475 (the entire disclosure of which is hereby incorporated by reference).

The term "alkyldienyl skeleton" is intended to include such ligands as cyclopentadienyl, alkyl-substituted cyclopentadienyl compounds such as methyl cyclopentadienyl, ethyl cyclopentadienyl, n-butyl cyclopentadienyl, dimethyl cyclopentadienyl, pentamethyl cyclopentadienyl, and the like. Other examples of such cycloalkyldienyl ligands include substituted and unsubstituted indenyls or fluorenyls, tetrahydroindenyls, and the like. Examples of such metallocenes are disclosed in U.S. Pat. No. 5,091,352 (the entire disclosure of which is incorporated herein by reference). Some specific examples include bis cyclopentadienyl zirconium dichloride, bis(methylcyclopentadienyl) zirconium dichloride, and bis(n-butyl cyclopentadienyl) zirconium dichloride.

It is also preferred to have two of the L groups be cycloalkyldienyl-type groups which are bonded together by a suitable bridging group. Some such metallocenes are referred to herein as sandwich-bonded metallocenes. The term "sandwich-bonded metallocenes" is used herein to indicate that the metal of the metallocene is sandwiched between two opposed cycloalkyldienyl portions of the bridged ligand. Some examples of bridged sandwich bonded metallocenes include 1-(9-fluorenyl)-1-(cyclopentadienyl) methane zirconium dichloride, fluorenyl cyclopentadienyl dimethyl methane zirconium dichloride, 1,2-bis-indenyl ethane hafnium dichloride and the like. Metallocenes also include so-called "half-sandwich-bonded". Suitable examples would be (1-fluorenyl-1-cyclopentadienyl methane) zirconium trichloride, cyclopentadienyl zirconium trichloride, and indenyl zirconium trichloride.

It is also preferred to employ the solid organo-aluminoxane-insolublization-agent-composition in combination with the third generation supported high activity transition metal containing olefin polymerization catalysts. Some examples of typical high activity solid transition metal containing olefin polymerization catalysts include those disclosed in U.S. Pat. Nos. 4,326,988 and 4,394,291 (the entire disclosures of which are incorporated herein by reference).

It is also preferred to prepare a prepolymerized solid catalyst composition by combining the transition metal component and the organo-aluminoxane solid composition and conducting prepolymerization of an olefin to produce an active prepolymerized solid, which can be used later.

The particular polymerization conditions employed using the catalysts comprising organo-aluminoxane compositions can vary depending upon the particular results desired. The ratio of the transition metal catalyst to the solid organo-aluminoxane composition can vary widely depending upon the particular catalyst selected and the results desired. Typically, the atomic ratio of aluminum in the organo-aluminoxane composition to the transition metal is in the range of about 1/1 to about 10000/1, preferably about 15/1 to about 1000/1, and more preferably about 50/1 to about 1000/1.

Examples of some monomers for polymerization include ethylene and alpha-olefins having 3 to 20 carbon atoms, such as propylene, 1-butene, 3-methyl-1-butene, 3-methyl-1-pentene, 3 ethyl-1-hexene, 1-hexene, 4-methyl-1-pentene, 1-octene, 1-hexadecene, cyclopentene, norbornene, styrene, 4-methyl styrene, vinyl cyclohexane, butadiene, and the like and mixtures thereof.

The present invention is particularly useful in slurry type polymerizations since it allows one to carry out such polymerizations more effectively than has heretofore been possible. A particularly preferred type of slurry polymerization involves the continuous loop reactor type polymerization wherein monomer, feed, catalyst, and diluent, if employed, are continuously added to the reactor as needed and polymer product is continuously or at least periodically removed. Generally in such processes, ethylene is polymerized in the presence of a suitable liquid diluent, a higher alpha-olefin comonomer, and optionally, hydrogen. The polymerization temperature can vary over the range which will allow for slurry polymerization. Often the slurry polymerization would be conducted at a temperature in the range of about 50° C. to about 110° C., although higher and lower temperature can be used.

EXAMPLES

A further understanding of the present invention and its objects and advantages will be provided by referring to the following examples.

Example One

Synthesis of Organo-Aluminoxane in Accordance with this Invention and its Use in Polymerizing Ethylene A 200 mL mixture that comprised methylaluminoxane (30 weight percent) and trimethylaluminum, and toluene, was dried under vacuum to obtain a solid. A 3 gram portion of this solid was slurried in 25 mL of toluene, under nitrogen, to obtain a methylaluminoxane mixture. A mixture of 0.15 grams of methoxy boroxine and 6 mL of toluene was added to this methylaluminoxane mixture over a time period of forty minutes. After this time period, the resulting composition was stirred at room temperature for one hour and then filtered. A white solid was obtained, which was then washed with 25 mL of hexane, and then dried under vacuum (final white solid). A yield of 96 percent was obtained based on the weight of the 3 grams of methylaluminoxane and the 0.15 grams of methoxy boroxine.

A slurry was obtained by mixing 502 mg of the final white solid with 20 mL of toluene. This slurry was then agitated for 30 minutes. The resulting slurry was then mixed with 10 mg of (n-butylcyclopentadienyl)$_2$ zirconium dichloride. This mixture was then stirred for 60 minutes and then dried under vacuum to obtain the catalyst system.

This catalyst system was then evaluated for activity in the polymerization of ethylene under slurry polymerization conditions. The polymerization was conducted at 90° C. in two liters of isobutane in the presence of hydrogen in an Autoclave Engineers reactor. The partial pressure of isobutane and hydrogen was about 225 psi and the partial pressure of ethylene was about 225 psi. The polymerization was carried out for one hour. The activity was 2.61×10$^6$ grams of polyethylene per gram of zirconium.

Example Two

Comparative Example the Use of Organo-Aluminoxane in Polymerizing Ethylene

To 6 gallons of hexane, 7.3 lbs of a mixture of 10 weight percent methylaluminoxane in toluene was added, the resulting mixture was stirred for one hour. Then a 300 mL solution containing 48.7 grams of trimethoxyboroxine was added over a one hour period. The resulting mixture was allowed to stand overnight. The solvent was then decanted and the solid material was washed and then dried. A yield of 86 percent was obtained based on the weight of the 331.4 grams of methylaluminoxane and the 48.7 grams of methoxy boroxine.

To 6 gallons of hexane, 7.35 lbs of a mixture of 10 weight percent methylaluminoxane in toluene was added, the resulting mixture was stirred for one hour. Then a 300 mL solution containing 48.7 grams of trimethoxyboroxine was added over a one hour period. The resulting mixture was stirred for 3.75 hours and allowed to stand overnight. After re-agitating for 15 minutes, a 500 mL hexane solution containing 4.87 grams (n-butylcyclopentadienyl)$_2$ zirconium dichloride was added over about a 1 hour period. The resulting slurry was stirred for three hours.

This catalyst system was then evaluated for activity in the polymerization of ethylene under slurry polymerization conditions. The polymerization was conducted at 90° C. in two liters of isobutane in the presence of hydrogen in an Autoclave Engineers reactor. The partial pressure of isobutane and hydrogen was about 225 psi and the partial pressure of ethylene was 225 psi. The polymerization was carried out for one hour. The activity was 1.03×10$^6$ grams of polyethylene per gram of zirconium.

That which is claimed:

1. A process to produce organo-aluminoxane compositions, said process comprising:
   (a) desiccating a first mixture, where said first mixture comprises organo-aluminoxane molecules intermixed with a solvent, to produce a first composition, where said first composition comprises organo-aluminoxane molecules and where said first composition is a solid;
   (b) mixing said first composition with a solvent to produce a second mixture, where said second mixture comprises organo-aluminoxane molecules and said solvent;
   (c) contacting said second mixture with an insolublization agent to produce said organo-aluminoxane compositions.

2. A process according to claim 1 wherein said insolublization agent is a dihydrocarbyl Group IIA metal compound.

3. A process according to claim 1 wherein said solvent is aliphatic.

4. A process according to claim 1 wherein said solvent is paraffinic.

5. A process according to claim 1 wherein said desiccating comprises vacuum drying.

6. A process according to claim 1 wherein said desiccating is conducted in the presence of a particulate material.

7. A process according to claim 6 wherein said particulate material comprises silica.

8. A process according to claim 1 wherein said solvent is selected from the group consisting of linear, branched, and cyclic alkanes which are liquids at temperatures from about −80° C. to about 175° C. and pressures from about 0 psia to about 1000 psia.

9. A process according to claim 1 wherein said solvent is selected from the group consisting of pentane, hexane, heptane, octane, nonane, decane, isobutane, isopentane, isohexane, isoheptane, isooctane, isononane, isodecane, and mixtures thereof.

10. A process according to claim 1 wherein said steps (b) and (c) are conducted simultaneously by mixing the solvent to be used in step (b) with the insolublization agent before mixing said solvent with the first composition.

11. A process according to claim 1 wherein said contacting is conducted in the presence of a particulate material.

12. A process according to claim 11 wherein said particulate material comprises silica.

13. A process according to claim 1 wherein said insolublization agent is an oxide, where said oxide consists of those molecules where oxygen is free to react with the organo-aluminoxane molecules.

14. A process according to claim 13 wherein said oxide is selected from the group consisting of carbon monoxide and carbon dioxide.

15. A process according to claim 1 wherein said insolublization agent is a peroxide where said peroxide is represented by the formula R$^2$OOR$^3$, wherein said R$^2$ and R$^3$ are individually selected from the group consisting of hydrogen, hydrocarbyl, and hydrocarbonyl radicals selected from the group consisting of alkyl, cycloalkyl, aryl, alkenyl, and alkynyl radicals containing 24 carbon atoms, with the proviso that at least one of R$^2$ and R$^3$ is a hydrocarbyl or hydrocarbonyl radical.

16. A process according to claim 15 wherein said R$^2$ and R$^3$ contain 1 to 18 carbon atoms.

17. A process according to claim 16 wherein said R$^2$ and R$^3$ contain 1 to 12 carbon atoms.

18. A process according to claim 15 wherein said R$^2$ and R$^3$ are both individually hydrocarbyl radicals.

19. A process according to claim 15 wherein said peroxide is selected from the group consisting of diethyl peroxide, diacetyl peroxide, tert-butyl hydroperoxide, di-tert-butyl peroxide, 2,5-dimethyl-(2,5-di(tert-butylperoxy) hexane, tert-amyl hydroperoxide, di-tert-amyl peroxide, dibenzoyl peroxide, dicrotonyl peroxide, bis(1-methyl-1-phenylethyl) peroxide, dilauryl peroxide, peroxybenzoic acid, peroxyacetic acid, tert-butyl perbenzoate, tert-amyl perbenzoate, peroxybutyric acid, peroxycinnamic acid, tert-butyl peracetate and mixtures thereof.

20. A process according to claim 1 wherein said insolublization agent is an alkylene oxide, where alkylene oxide is represented by the formulas

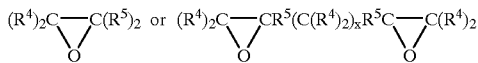

wherein said $R^4$ and $R^5$ are individually selected from the group consisting of hydrogen and alkyl radicals containing 1 to 12 carbon atoms, x is 0 to 12.

21. A process according to claim 20 wherein said alkyl radicals are selected from the group consisting of methyl, ethyl, propyl, isobutyl, isoamyl, octyl, and decyl.

22. A process according to claim 20 wherein said $R^4$ and $R^5$ are individually selected from the group consisting of hydrogen and alkyl radicals containing 1 to 12 carbon atoms, x is 0 to 8.

23. A process according to claim 20 wherein said alkylene oxide is selected from the group consisting of ethylene oxide, propylene oxide, 2,2-dimethyloxirane, 1,2-dimethyloxirane, 1,2-diethyloxirane, cyclohexene oxide, 1-methylcyclohexene oxide, and mixtures thereof.

24. A process according to claim 1 wherein said insolublization agent is an alkylene oxide where alkylene oxide includes glycidyl ethers having the formula $R^6(G)_y$ wherein said $R^6$ is a hydrocarbyl radical having 2 to 12 carbons, and G is the glycidyl group, the formula of which follows,

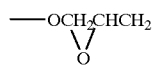

and y is 1 or 2.

25. A process according to claim 24 herein said alkylene oxide contains 2 to 16 carbon atoms.

26. A process according to claim 25 wherein said alkylene oxide contains 2 to 12 carbon atoms.

27. A process according to claim 24 wherein said alkylene oxide is selected from the group consisting of glycidyl isopropyl n-butyl ether, glycidyl tert-butyl ether, 2,2-dimethyl-1,3-propanediol diglycidyl ether, and 1,4-butanediol diglycidyl ether.

28. A process according to claim 1 wherein said insolublization agent is an organic compound containing boron, where said organic compound containing boron, includes organic boranes, organic borates, and organic boroxines.

29. A process according to claim 28 wherein said organic boranes are those that are acid hydrogen free and that contain the following functionality

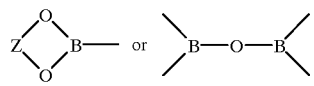

wherein Z is a bridging unit between two oxygen atoms.

30. A process according to claim 29 wherein said organic borane is selected from the group consisting of the following

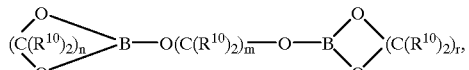

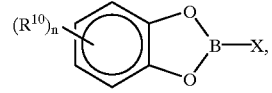

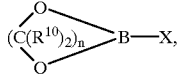

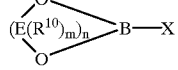

and $(R^{10})_2BOB(R^{10})_2$, wherein said $R^{10}$ is individually selected from the group consisting of hydrogen and hydrocarbyl radicals; n, m, and r are integers; each E is individually selected from C, Si, Ge, Sn, B, Ga, In, P, As, and Sb with the proviso that at least one E is not C; and X is selected from the group consisting of hydrogen, hydrocarbyl radicals having 1 to 20 carbon atoms, halides, hydrocarbyloxy radicals having 1 to 20 carbons, and $-N(R^{10})_n$ radicals.

31. A process according to claim 30 wherein said hydrocarbyl radicals are aryl or alkyl having 1 to 20 carbon atoms.

32. A process according to claim 30 wherein said n, m, r, are integers in the range of 1 to 10.

33. A process according to claim 30 wherein said organic compounds containing boron are selected from the group consisting of catechol borane, diphenyl borinic anhydride, dibutyl borinic anhydride, trimethylene borate, methyl catechol borane, trimethylboroxine, and mixtures thereof.

34. A process according to claim 1 wherein said insolublization agent is an organic carbonate having the following formula

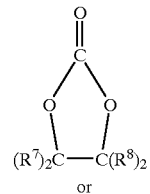

wherein $R^7$ and $R^8$ are individually selected from the group consisting of hydrogen and alkyl radicals containing 1 to 10 carbon atoms and $R^9$ is a hydrocarbyl radical selected from the group consisting of alkyl, cycloalkyl, aryl, aralkyl, and alkylaryl radicals having 1 to 12 carbon atoms.

* * * * *